(12) United States Patent
Bodorin et al.

(10) Patent No.: US 7,730,530 B2
(45) Date of Patent: Jun. 1, 2010

(54) SYSTEM AND METHOD FOR GATHERING EXHIBITED BEHAVIORS ON A .NET EXECUTABLE MODULE IN A SECURE MANNER

(75) Inventors: Daniel M. Bodorin, Kirkland, WA (US); Adrian M. Marinescu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 798 days.

(21) Appl. No.: 10/769,097

(22) Filed: Jan. 30, 2004

(65) Prior Publication Data

US 2005/0172115 A1  Aug. 4, 2005

(51) Int. Cl.
G06F 11/00  (2006.01)

(52) U.S. Cl. .............................. 726/22; 713/152; 726/25

(58) Field of Classification Search .................. 713/152; 726/22–25
See application file for complete search history.

(56) References Cited

U.S. PATENT DOCUMENTS

| | | | |
|---|---|---|---|
| 5,485,575 A | | 1/1996 | Chess et al. |
| 5,842,002 A | * | 11/1998 | Schnurer et al. ............... 703/21 |
| 5,983,348 A | * | 11/1999 | Ji ................................. 726/13 |
| 6,192,512 B1 | * | 2/2001 | Chess .......................... 717/127 |
| 6,357,008 B1 | | 3/2002 | Nachenberg |
| 6,594,686 B1 | | 7/2003 | Edwards et al. |
| 6,907,396 B1 | * | 6/2005 | Muttik et al. .................. 703/22 |
| 6,968,461 B1 | | 11/2005 | Lucas et al. |
| 7,203,681 B1 | | 4/2007 | Arnold et al. |
| 7,620,990 B2 | | 11/2009 | Bodorin |
| 2002/0035696 A1 | | 3/2002 | Thacker |
| 2002/0056076 A1 | * | 5/2002 | van der Made ............. 717/129 |
| 2003/0014550 A1 | | 1/2003 | Fischer et al. |
| 2003/0023865 A1 | | 1/2003 | Cowie et al. |
| 2003/0065926 A1 | | 4/2003 | Schiltz et al. |
| 2003/0101381 A1 | | 5/2003 | Mateev et al. |
| 2003/0110391 A1 | | 6/2003 | Wolff et al. |
| 2003/0115479 A1 | | 6/2003 | Edwards et al. |
| 2004/0015712 A1 | | 1/2004 | Szor |
| 2005/0132206 A1 | | 6/2005 | Palliyl et al. |
| 2005/0172337 A1 | | 8/2005 | Bodorin |
| 2005/0188272 A1 | | 8/2005 | Bodorin |
| 2006/0248582 A1 | | 11/2006 | Panjwani et al. |

OTHER PUBLICATIONS

C. Ko, "Execution Monitoring of Security-Critical Programs in Distributed Systems: A Specification-based Approach", PhD thesis, UC Davis, 1996.*

(Continued)

*Primary Examiner*—Kimyen Vu
*Assistant Examiner*—Yogesh Paliwal
(74) *Attorney, Agent, or Firm*—Workman Nydegger (57) ABSTRACT

A system and method for gathering exhibited behaviors of a .NET executable module in a secure manner is presented. In operation, a .NET behavior evaluation module presents a virtual .NET environment to a Microsoft Corporation .NET code module. The .NET behavior evaluation module implements a sufficient number of aspects of an actual Microsoft Corporation .NET environment that a .NET code module can execute. As the .NET code module executes, the .NET behavior evaluation module records some of the exhibited behaviors, i.e., .NET system supplied libraries/subroutines, that are associated with known malware. The recorded behaviors are placed in a behavior signature for an external determination as to whether the .NET code module is malware, i.e., an unwanted computer attack.

5 Claims, 8 Drawing Sheets

OTHER PUBLICATIONS

White et al., "Anatomy of a Commercial-Grade Immune System", http://citeseer.ist.psu.edu/white99anatomy.html, 1999, pp. 1-28.
Office Action mailed May 1, 2007 cited in U.S. Appl. No. 10/769,038.
Office Action mailed Nov. 13, 2007 cited in U.S. Appl. No. 10/769,038.
Office Action mailed Jul. 24, 2008 cited in U.S. Appl. No. 10/769,038.
Office Action mailed Mar. 5, 2009 cited in U.S. Appl. No. 10/769,038.
Office Action mailed Sep. 16, 2009 cited in U.S. Appl. No. 10/769,038.
Office Action mailed Oct. 30, 2007 cited in U.S. Appl. No. 10/769,103.
Office Action mailedJun. 17, 2008 cited in U.S. Appl. No. 10/769,103.
Office Action mailed Dec. 26, 2008 cited in U.S. Appl. No. 10/769,103.
Notice of Allowance mailed Jul. 20, 2009 cited in U.S. Appl. No. 10/769,103.

* cited by examiner

| | | | |
|---|---|---|---|
| 700 INTERNET_OPEN_URL | MATCH_ANYTHING (704) | NULL (706) | NULL |
| 702 INTERNET_READ_FILE | 1 | NULL | NULL |
| WRITE_FILE | NULL | NULL | NULL |
| OPEN_REGISTRY_KEY | "OPERATINGSYSTEM\CURRENTVERSION\RUN" (708) | NULL | NULL |
| SET_REGISTRY_VALUE | MATCH_ANYTHING | NULL | NULL |
| EXECUTE | MATCH_FILENAME".EXE" | 1 (710) | NULL |

Fig. 7B.

| | | | |
|---|---|---|---|
| 712 CREATE_OBJECT | OUTLOOK.APP | NULL | NULL |
| GET_NAME_SPACE | NULL | NULL | NULL |
| GET_ADDRESS_ENTRIES_COUNT | NULL | NULL | NULL |
| ADD_ATTACHMENTS | MATCH_FILENAME".EXE" | NULL | NULL |
| SEND | NULL | NULL | NULL |

SYSTEM AND METHOD FOR GATHERING EXHIBITED BEHAVIORS ON A .NET EXECUTABLE MODULE IN A SECURE MANNER

FIELD OF THE INVENTION

The present invention relates to a system and method for gathering the exhibited behaviors of an executable module during execution, and more particularly, a system and method for gathering the exhibited behaviors of a .NET executable module in a secure manner.

BACKGROUND OF THE INVENTION

As more and more computers are interconnected through various networks, such as the Internet, computer security also becomes increasingly more important. In particular, computer security in regard to external attacks from malware has become, and continues to become, increasingly more important. Malware, for purposes of the present discussion, is defined as executable modules representing unwanted computer attacks. As such, malware includes, but is not limited to, computer viruses, Trojan horses, worms, denial of service attacks, abuse/misuse of legitimate computer system functions, and the like. The primary defense against malware is anti-virus software.

Figure 1A:
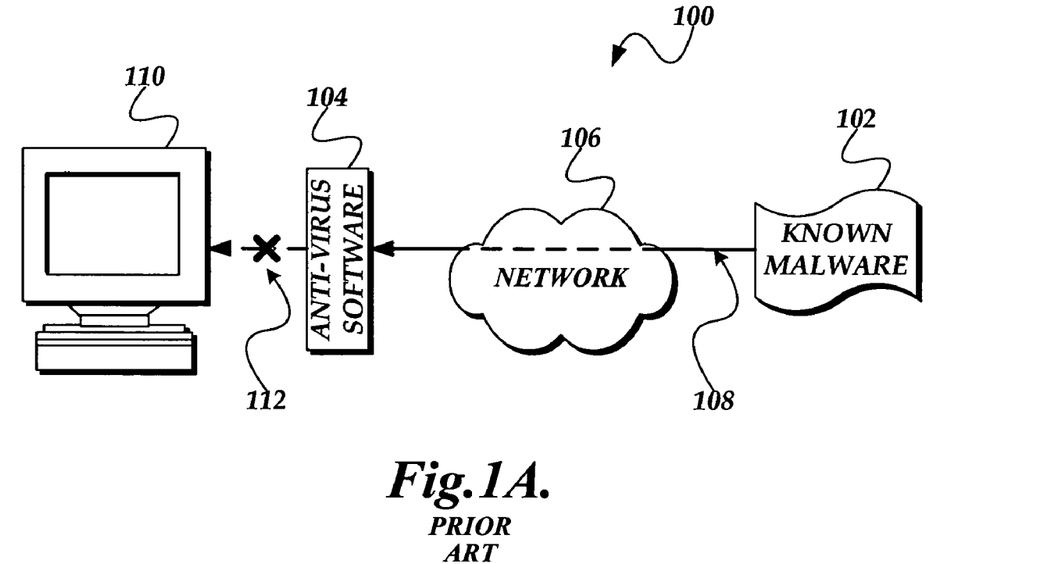
FIG. 1A is a pictorial diagram illustrating how current anti-virus software prevents known malware from reaching and infecting a computer.
Figure 1B:
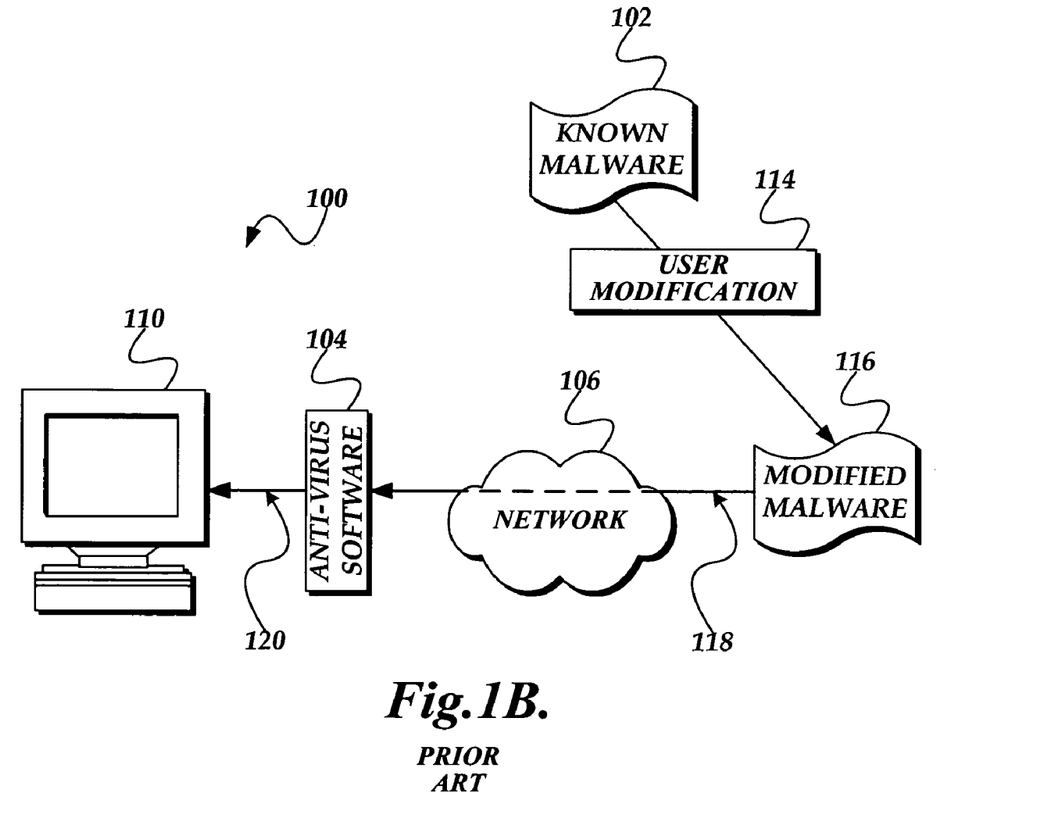
FIG. 1B is a pictorial diagram illustrating how current anti-virus software is unable to prevent modified, unknown malware from reaching and infecting a computer.

FIGS. 1A and 1B are pictorial diagrams illustrating how anti-virus software currently operates. In particular, FIG. 1A illustrates how anti-virus software detects known malware, and prevents the known malware from reaching and infecting a computer. Alternatively, FIG. 1B illustrates a common weakness of anti-virus software, particularly, how anti-virus software is unable to detect and prevent modified malware from reaching and infecting the computer. What is meant by "reaching" the computer is getting past the anti-virus software. Those skilled in the art will readily recognize anti-virus software almost always resides on the computer it is protecting, and operates on incoming data as it physically arrives at the computer. Thus, while incoming data, including malware, may be located at the computer, for purposes of the present invention, the incoming data does not actually "reach" the computer until it gets past the anti-virus software.

As shown in FIG. 1A, malware 102 is directed over a network 106 to the computer 110, as indicated by arrow 108. It will be appreciated that the malware 102 may be directed to the computer 110 as a result of a request initiated by the computer, or directed to the computer from another network device. However, as mentioned above, before the known malware 102 reaches the computer 110, anti-virus software 104 installed on the computer intercepts the malware and examines it. As is known in the art, currently, anti-virus software scans the incoming data as a file, searching for identifiable patterns, also referred to as signatures, associated with known malware. If a malware signature is located in a file, the anti-virus software 104 takes appropriate action, such as deleting the known malware/infected file, or removing the malware-infected portion from the infected file, sometimes referred to as cleaning the file. In this manner, anti-virus software 104 is able to prevent the known malware 102 from infecting the computer 110, as indicated by the arrow 112.

Those skilled in the art will appreciate that almost all unknown malware are actually rewrites or reorganizations of previously released malware. Indeed, encountering an absolutely novel malware is relatively rare, as most "new" malware are actually rewrites or rehashes of existing malware. Malware source code is readily available, and it is a simple task for a malicious party to change variable names, reorder lines of code, or somehow superficially modify the malware.

The result of rehashing or rewriting an existing malware is that the static appearance of the malware is altered, even though the functionality of the malware remains the same. As mentioned, current anti-virus software operates only on known malware. Thus "new" malware, while functionally identical to its original/parent malware, is not detectable or stopped by the installed anti-virus software 104 employing the pattern matching system.

FIG. 1B is a pictorial diagram illustrating how current anti-virus software is unable to prevent a modified malware from reaching a computer. As shown in FIG. 1B, known malware 102 undergoes a modification process 114, such as a rehash or rewrite, resulting in modified malware 116. As mentioned above, the modified malware 116 will most likely have a different static appearance, though its functionality will likely be identical. Also mentioned above, because the static appearance is modified, the modified malware 116 is not "known" malware recognized by the anti-virus software 104.

The modified malware 116 is directed through the network 106 to the computer 110, as indicated by arrow 118. The anti-virus software 104 attempts to identify the modified malware 116 to determine whether it is known malware and should be stopped. As the modified malware 116 is, as yet, an unknown modification, and because the signature of the modified malware is not the same as the original malware 102, the anti-virus software 104 fails to identify the modified malware as malware, and permits it to "reach" the computer 110, as indicated by arrow 120. Upon reaching the computer 110, the modified malware 116 will typically perform its intended, destructive purpose.

It is only after an anti-virus software provider identifies a signature pattern for the modified malware 116, and then updates the anti-virus software 104, that the anti-virus software can protect the computer 110 from the modified malware 116. Clearly, this delay leaves anti-virus software users exposed to new malware. Additionally, constantly evaluating unknown malware to determine a static signature and then updating anti-virus software with that signature is a costly process, that users ultimately must pay. It is also inefficient, especially when considering that most malware are only superficially modified from other, known malware. Thus, it would be beneficial if malware could be identified, not just by its static signature, but also by its exhibited behaviors. However, the only way to currently evaluate the exhibited behavior of malware is to somehow permit it to execute on a computer 110. Of course, this would be entirely unacceptable as the malware would perform its ill-intended effects on the computer 110 during its execution.

Recent advances in malware detection address the problem of detecting malware according to its exhibited behaviors. In particular, a system and method for determining whether an executable module is malware according to its exhibited behavior is set forth in co-pending and commonly-assigned U.S. patent application Ser. No. 10/769,038, filed Jan. 30, 2004, published Aug. 25, 2005, as US-2005/0188272-A1, entitled "System and Method for Determining Whether an Executable Module is Malware According to Its Exhibited Behavior", which is incorporated herein by reference. However, while the above-identified patent application presents a system and method for evaluating whether an executable module is malware according to its exhibited behaviors, the problem remains on how to gather the exhibited behaviors in a secure manner. Additionally, there are many types of executable modules, including, but not limited to compiled executable modules, such as Microsoft Corporation's Windows XP executable modules, and interpreted executable modules, such as Microsoft Corporation's .NET executable modules.

In light of the above-identified problems, and in further light of the co-pending, commonly assigned patent application, what is needed is a system and method for gathering exhibited behaviors of a Microsoft Corporation's .NET executable module. The present invention addresses this and other issues found in the prior art.

SUMMARY OF THE INVENTION

According to aspects of the present invention, a system for securely gathering exhibited behaviors of a Microsoft Corporation .NET code module is presented. In practice, the system includes an interpreter module that provides a secure virtual Microsoft Corporation .NET environment for executing at least some of the .NET instruction in the .NET code module. The virtual .NET environment is unconnected to an actual Microsoft Corporation .NET environment. The system also includes a behavior recorder. The behavior recorder records a subset of the executed .NET instructions in a behavior signature.

According to additional aspects of the present invention, a system for securely gathering exhibited behaviors of a Microsoft .NET code module is presented. The system includes an interpreter means that provides a secure virtual Microsoft Corporation .NET environment for interpreting at least some of the .NET instruction in the .NET code module. The system also includes a library means. The library means implements subroutines corresponding to a subset of actual .NET system supplied subroutines. The system further includes a behavior recorder means. The behavior recorder means records calls to a subset of the subroutines implemented by the library means in a behavior signature. The recorded subroutine calls correspond to behaviors exhibited by known malware.

According to yet further aspects, a method for securely gathering exhibited behaviors of a Microsoft .NET code module is presented. For each .NET instruction in the .NET code module a determination is made as to whether the .NET instruction is a subroutine call to a .NET system supplied subroutine, and if so: a stub subroutine corresponding to the .NET system supplied subroutine is called; and, if the called stub subroutine is an interesting stub subroutine, the call to the interesting stub subroutine is written to a behavior signature. The stub subroutine is unconnected to the corresponding .NET system supplied subroutine.

According to yet further aspects of the present invention, a computer-readable medium bearing computer-executable instructions which, when executed, carry out a method for securely gathering exhibited behaviors of a Microsoft .NET code module is presented. For each .NET instruction in the .NET code module a determination is made as to whether the .NET instruction is a subroutine call to a .NET system supplied subroutine, and if so: a stub subroutine corresponding to the .NET system supplied subroutine is called; and, if the called stub subroutine is an interesting stub subroutine, the call to the interesting stub subroutine is written to a behavior signature. The stub subroutine is unconnected to the corresponding .NET system supplied subroutine.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 2:
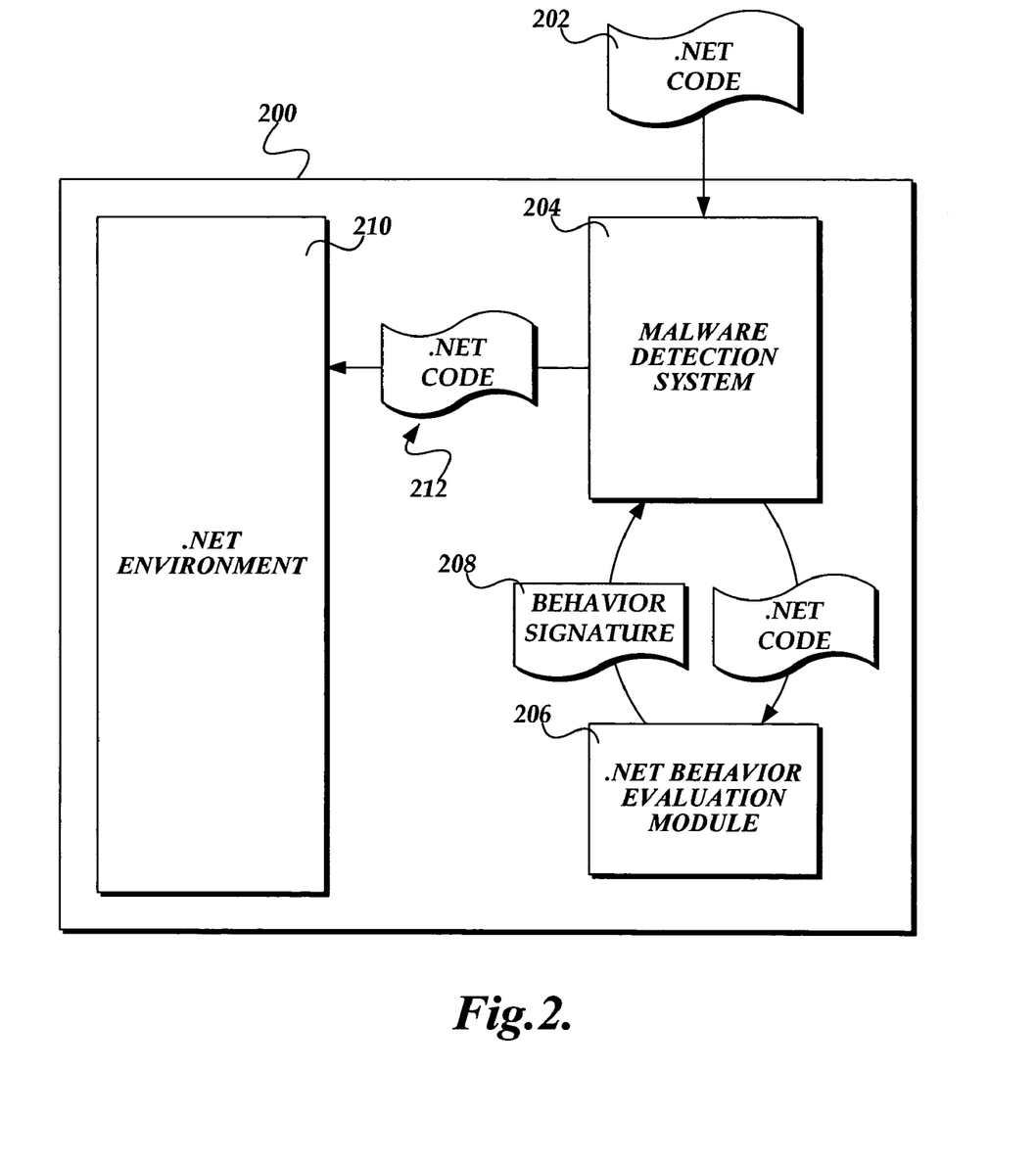
FIG. 2 is a block diagram of an exemplary environment suitable for operating the present invention.

As mentioned above, the present invention, particularly gathering exhibited behaviors of a .NET code module, operates in conjunction with a malware detection system which, according to the gathered exhibited behaviors, determines whether the .NET executable module is malware. FIG. 2 is a block diagram of an exemplary computer system 200 having a malware detection system, suitable for implementing the present invention.

The exemplary computing system 200 includes a malware detection system 204, a .NET behavior evaluation module 206 for gathering exhibited behaviors of a .NET executable module, and a .NET environment 210. Those skilled in the art will appreciate that other components will also be present in an operational computer system, include many other operating system components, which for illustration purposes, are not shown in FIG. 2.

In operation, to protect the computer system 200 from potential malware, when the computer system 200 first receives an executable module, such as .NET executable module 202, the malware detection system 204 delivers the executable module to an evaluation module based on the executable module's type. For example, after receiving the .NET executable module 202, the malware detection system delivers it to the .NET behavior evaluation module 206 which is specifically designed for gathering exhibited behaviors of a .NET executable module.

The .NET behavior evaluation module 206 is a virtual .NET environment in which a .NET executable module may be safely executed. In other words, the .NET behavior evaluation module 206 appears to the .NET executable module 202 as the functional .NET environment 210 on the computer system 200. However, in operation, as a virtual environment, the .NET behavior evaluation module 206 confines the effects of the .NET executable module 202 to the confines of the virtual environment. A virtual environment in which an executable module may be safely executed is often referred to as a sandbox, i.e., the effects of the executing module are confined to the sandbox.

The .NET behavior evaluation module 206 "executes" the .NET executable module 202 within its virtual environment and records certain behaviors exhibited by the .NET executable module 202 during its execution. When the .NET executable module 202 has completed execution, the .NET behavior evaluation module 206 stores the recorded exhibited behaviors in a behavior signature 208 and returns the behavior signature 208 to the malware detection system 204. The malware detection system 204 then can determine, based on the behavior signature 208 corresponding to the exhibited behaviors of the .NET executable module 202, whether the .NET executable module is malware. Only if the malware detection system 204 is able to determine that the .NET executable module 202 is not malware, is the .NET executable module then passed to the computer system's actual NET environment 210 for execution, as indicated by arrow 212.

While the .NET behavior evaluation module 206 is illustrated above as residing on the exemplary computer system 200, it is for illustration purposes only, and should not be construed as limiting upon the present invention. According to one embodiment, the .NET behavior evaluation module 206 may be implemented on a computing device completely separated from the computing system 200 where the actual .NET environment 210 and/or the malware detection system 204 reside. Further, the .NET behavior evaluation module 206 is not required to be implemented on a computing device capable of operating an actual .NET environment 210. Instead, the .NET behavior evaluation module 206 may be installed and operated on any computing system capable of implementing the functionality described below, including specialized computing systems specifically designed to detect malware.

A more detailed description of how the mal are detection system 204 uses the behavior signature 208 generated by the .NET behavior evaluation module 206 to determine whether the .NET code module 202 is malware is described in greater detail in regard to co-pending and commonly-assigned U.S. patent application Ser. No. 10/769,038, filed Jan. 30, 2004, published Aug. 25, 2005, as US-2005/0188272-A1 entitled, "System And Method For Detecting Malware In An Executable Code Module According To The Code Module's Exhibited Behavior," which is incorporated herein by reference.

Figure 3:
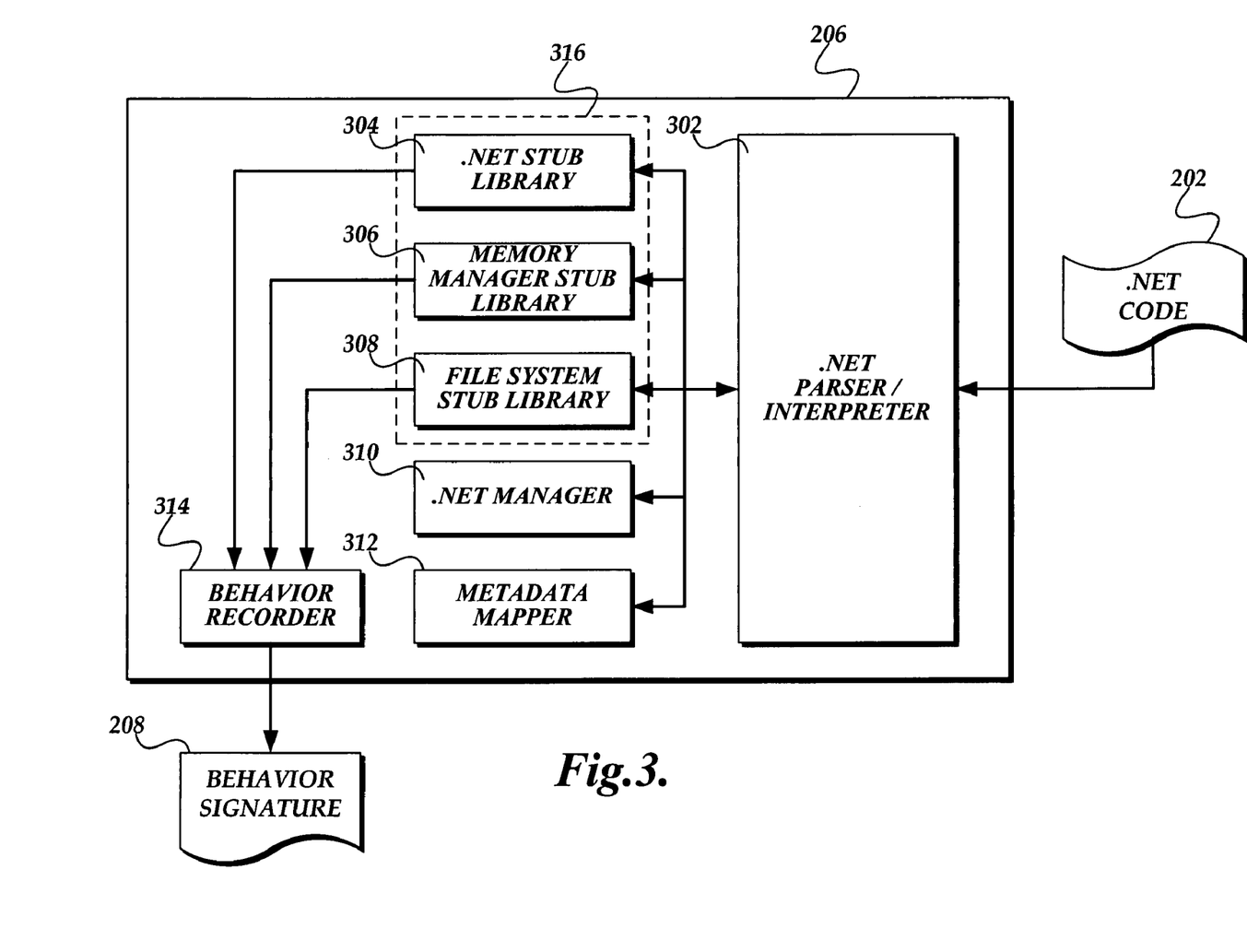
FIG. 3 is a block diagram of an exemplary .NET behavior evaluation module for safely executing a .NET code module and recording exhibited behaviors of the .NET code module.

FIG. 3 is a block diagram of an exemplary .NET behavior evaluation module 206 for safely executing a .NET code module 202 and recording exhibited behaviors of the .NET code module. The .NET behavior evaluation module 206 includes a .NET parser/interpreter 302, various stub libraries 316 including a .NET stub library 304, a memory manager stub library 306, and a file system stub library 308, a .NET manager 310, a metadata mapper 312, and a behavior recorder 314. In addition to those components identified above, those skilled in the art will appreciate that other components of a .NET behavior evaluation module may also be present. However, the above-identified components/libraries represent those items that are more important for the proper operation of the present invention. Additionally, it should be noted that the above-identified components represent logical components, not actual components. As such, those skilled in the art will appreciate that these components may be combined or subdivided in various manners for implementation purposes.

As is known to those skilled in the art, Microsoft Corporation's .NET environment is an interpretive environment. In other words, code modules generated for execution in a .NET environment, referred to as the .NET code modules, are organized as a collection of interpretable tokens, and are typically not compiled as executable code for a specific machine. As such, .NET code modules may be platform independent, whereas the .NET environment, which is installed on a computer system and which interprets the .NET code modules, is usually platform dependent.

As an interpretive environment, a .NET environment 210 includes a parser and interpreter that parses tokens from a .NET code module 202 and interprets the tokens by executing instructions corresponding to the tokens. As the functional .NET environment 210 includes an interpreter to process the tokens in a .NET code module 202, the .NET behavior evaluation module 206 therefore includes a .NET parser/interpreter 302 that parses the .NET code module 202 and interprets the parsed tokens. However, as the .NET behavior evaluation module 206 implements a virtual .NET environment, the .NET behavior evaluation module 206 implements the functionality of the actual .NET environment 210 only to the extent that a sufficiently realistic virtual environment is created for the .NET code module. In other words, only the functionality necessary to "fool" the .NET code module 202 into operating as if it were in an actual .NET environment 210 is implemented within the .NET behavior evaluation module 206. Thus, the .NET parser/interpreter 302 must "handle" all .NET tokens, whether or not the functionality is actually fully implemented, or simply ignored by the .NET behavior evaluation module 206 as a whole.

The actual level to which the .NET behavior evaluation module 206 implements the functionality of an actual .NET environment 210 is implementation specific. However, basic operations, such as arithmetic operations and function calling abilities, are likely candidates for being implemented in the .NET behavior evaluation module 206. Other likely areas of functionality implemented in the .NET behavior evaluation module 206 include memory management and basic file input/output.

As is known in the art, a .NET code module 202 includes a data area in which a substantial portion of information needed to "execute" the .NET code module resides. This data area includes subroutine information as well as program data. To access this information, the .NET behavior evaluation module 206 provides a metadata mapper 312 to assist the .NET parser/interpreter by extracting data necessary for interpreting specific tokens from the data area of the .NET code module 202.

One area in which the .NET behavior evaluation module 206 may implement a less than complete functional .NET system is in the .NET system supplied libraries. While all .NET library calls must be "handled" by the .NET parser/interpreter 302, according to one embodiment of the present invention, not all .NET system libraries need be functionally implemented. In fact, in many cases, a .NET system library subroutine need not be implemented at all. In such a case, the .NET parser/interpreter 302 simply "ignores" the token that calls the unimplemented system subroutine. For example, some .NET system library subroutines return no value, and according to the present invention are not related to malware behaviors. Thus, these .NET system library subroutines may be "ignored" by the .NET parser/interpreter 302. Alternatively, some .NET system library subroutines return certain values. These .NET system library subroutines may be implemented to the extent that they return a predetermined, default value. Still further, other .NET system library subroutines must be implemented to perform some actions, even though they exist only within a virtual environment. Pseudo-code examples of these .NET system library subroutines are provided below in regard to FIG. 6.

In order to access the .NET system library subroutines, the .NET behavior evaluation module 206 includes a .NET manager 310 for mapping the .NET system library subroutines referenced by a .NET code module 202 into one of the various stub libraries 316 of the .NET behavior evaluation module 206, provided of course, the subroutine is implemented at all. Thus, as the .NET parser/interpreter 302 encounters a .NET system supplied subroutine call, the .NET manager 310 identifies in which, if any, stub library the subroutine is located.

Some .NET system supplied subroutine are considered to be "interesting." Interesting routines are those which have been determined to be associated with malware. These "interesting" .NET system supplied subroutines are implemented to some degree within the .NET stub library 304. According to aspects of the present invention, and as will be described below in greater detail, these "interesting".NET system supplied subroutines, when called, issue a call to the behavior recorder 314 where the particular subroutine, as well as possibly some parameters passed to the subroutine, are recorded by the behavior recorder 314 in a behavior signature 208. As discussed above, the behavior signature 208 is then used by a malware detection system 204 in order to determine whether the .NET code module is malware.

Figure 4:
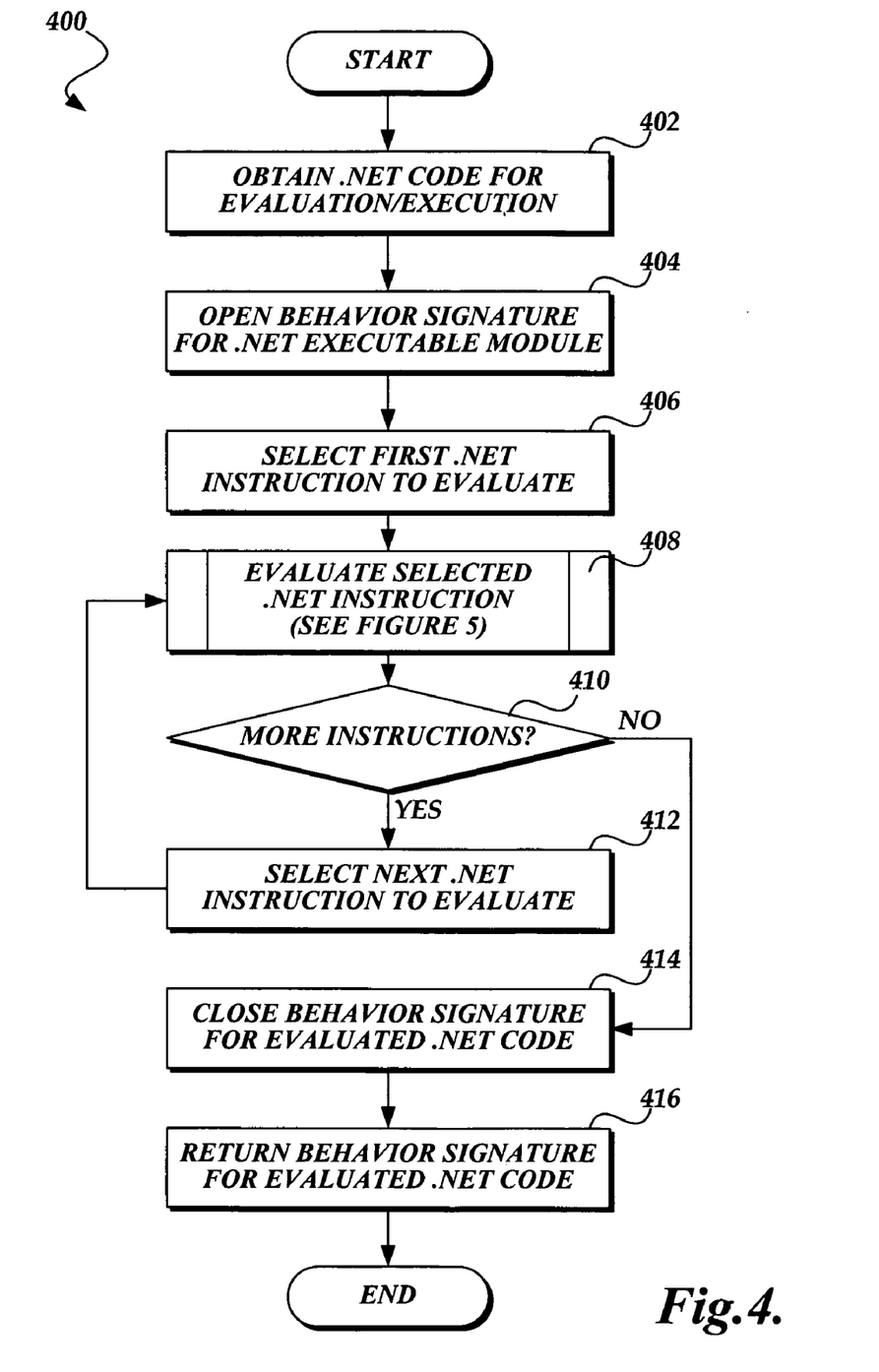
FIG. 4 is a flow diagram of an exemplary routine for recording exhibited behaviors of a .NET code module as it is executed in a .NET behavior evaluation module as described above in regard to FIG. 3.

FIG. 4 is a flow diagram of an exemplary routine 400 for gathering exhibited behaviors of a .NET code module 202 as it is safely executed in a .NET behavior evaluation module 206, as described above in regard to FIG. 3. Beginning at block 402, the .NET code module 202 to be evaluated is obtained. At block 404, a behavior signature 208 corresponding to the .NET code module 202 is opened. At block 406, the first .NET instruction in the .NET code module 202 is selected. Thereafter, at block 408, the selected .NET instruction is interpreted, as described in greater detail below in regard to FIGS. 5A and 5B.

Figure 5A:
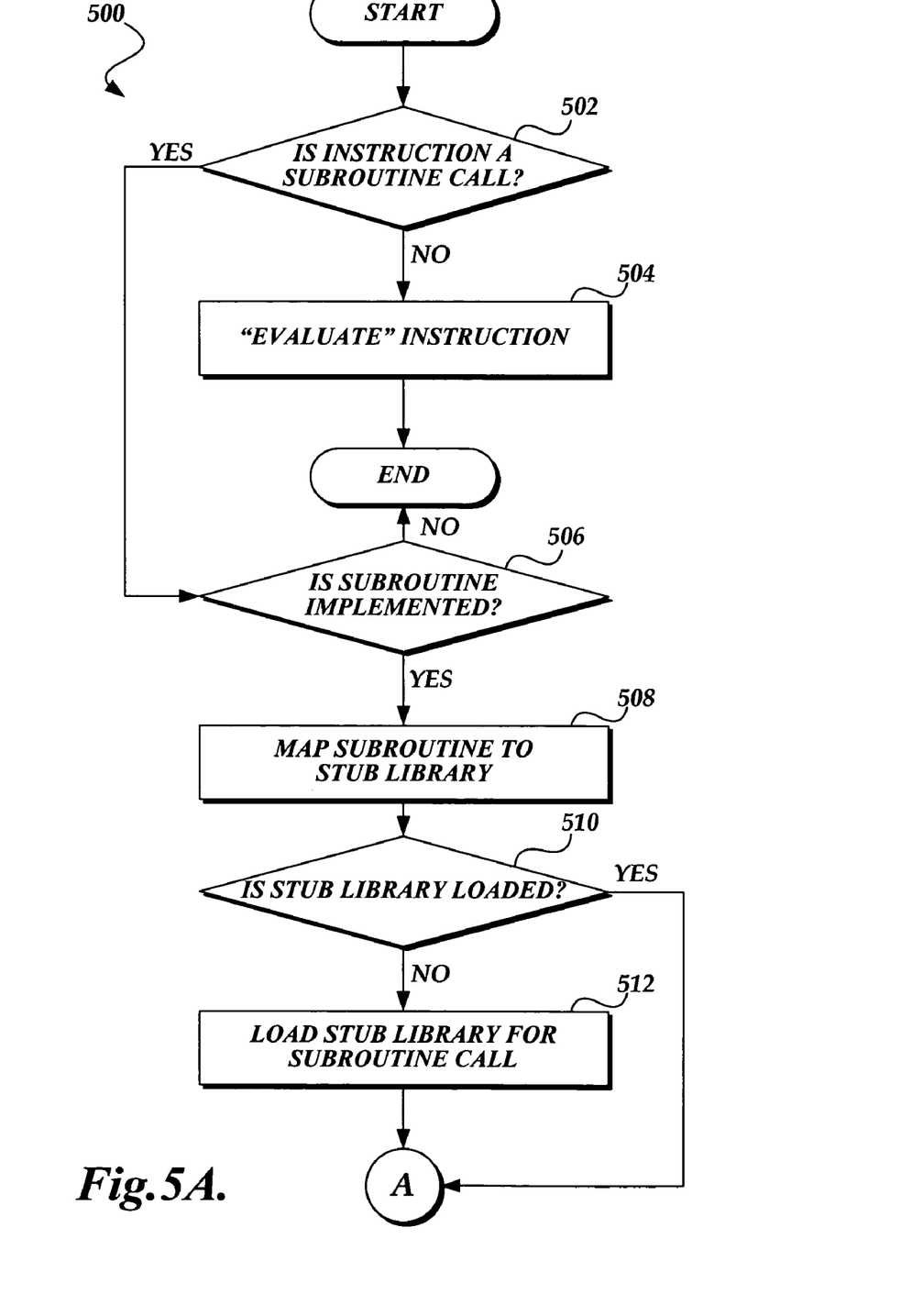
FIGS. 5A and 5B illustrate a flow diagram of an exemplary subroutine for evaluating a .NET instruction from a .NET code module, suitable for use in the exemplary routine described above in regard to FIG. 4.
Figure 5B:
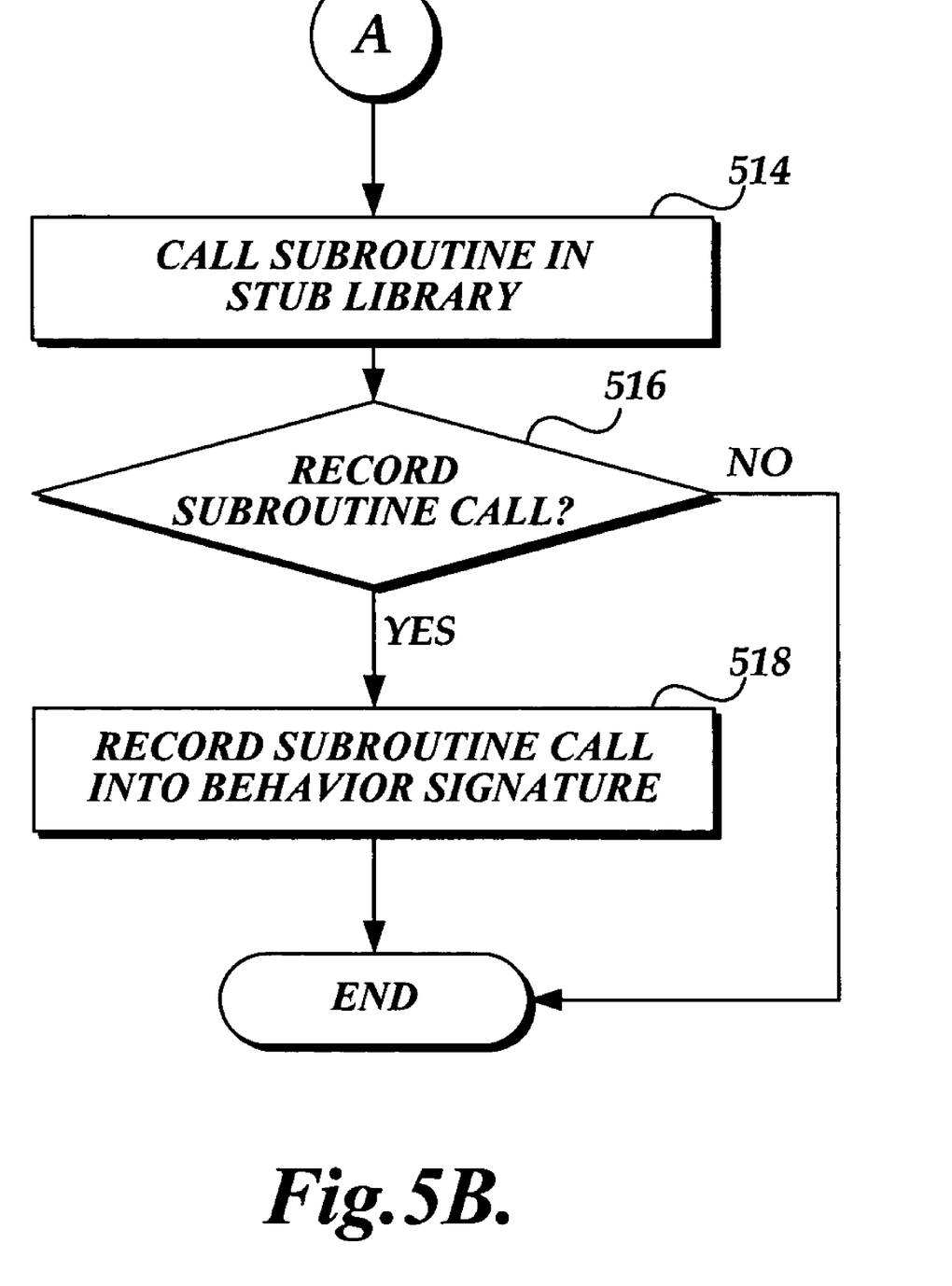

FIGS. 5A and 5B illustrate a flow diagram of an exemplary subroutine 500 for evaluating a .NET instruction from a .NET code module 202, suitable for use in the exemplary routine 400 described above in regard to FIG. 4. Beginning at decision block 502, a determination is made as to whether the selected .NET instruction is a .NET system supplied subroutine call. If the .NET instruction is not a .NET system supplied subroutine call, at block 504, the .NET processor 302 interprets the instruction. As described above in regard to FIG. 3, this may be a minimal interpretation. Simple operators, such as additions, subtractions, and the like, may be implemented using a stack structure similar in manner to the way in which an interpreter for an actual .NET environment 210 would operate. After interpreting the selected instruction, the subroutine 500 terminates.

Alternatively, if the .NET instruction is a .NET system supplied subroutine call, at decision block 506, a determination is made as to whether the .NET system supplied subroutine has been implemented in one of the stub libraries 316, such as the .NET stub library 304. If the .NET system supplied subroutine is not implemented by the .NET behavior evaluation module 206, the routine 500 terminates. As mentioned above, an unimplemented .NET system supplied subroutine implies that the subroutine is likely not needed for continued execution of the .NET code module 202, and furthermore, is not a subroutine implementing an "interesting" behavior associated with malware that should be recorded in the behavior signature 208.

According to an alternative embodiment of the present invention, all .NET system supplied subroutines are implemented to at least a minimal extent in one of the stub libraries 316, such as the .NET stub library 304. According to this alternative embodiment, if, at decision block 502, the selecting .NET instruction is a .NET supplied system subroutine call, then the process 500 proceeds immediately to block 508, and would not check whether the .NET supplied system subroutine is implemented.

If the .NET supplied system subroutine is implemented in one of the stub libraries 316, at block 508, the .NET supplied system subroutine is mapped to the particular stub library for calling purposes, such as the .NET stub library 304, the memory manager stub library 306, or the file system stub library 308. After mapping the .NET supplied system subroutine to the stub library in which the subroutine is implemented, at decision block 510, a determination is made as to whether the stub library is currently loaded and available for calling. If the stub library is not currently loaded, at block 512, the stub library implementing the .NET supplied system subroutine being called is loaded.

After loading the corresponding stub library, or alternatively, if the stub library is already loaded, at block 514, the .NET supplied system subroutine is called. Thereafter, at decision block 516, a determination is made as to whether the .NET supplied system subroutine call should be recorded. In other words, the determination is made as to whether the .NET supplied system subroutine call is one of the "interesting" behaviors, deemed to be associated with malware, that should be recorded in the behavior signature 208. Some of the .NET supplied system subroutine calls considered to be "interesting" are included in the following table:

System.Reflection.Assembly::GetModules( )
Microsoft.Win32.RegistryKey::OpenSubKey( )
Microsoft.Win32.RegistryKey::SetValue( )
System.IO.Stream::Write( )
System.IO.FileStream::ctor( )
System.IO.Directory::GetFiles( )
System.IO.BinaryWriter::Write( )
System.Diagnostics.Process::Start( )
Microsoft.VisualBasic.Interaction::CreateObject( )
Microsoft.VisualBasic.Interaction::Shell( )
Microsoft.VisualBasic.CompilerServices.LateBinding::LateGet( )
Microsoft.VisualBasic.FileSystem::Dir( )

If the .NET supplied system subroutine call is to be recorded, at block 518 the behavior recorder 308 is notified and records the "interesting" behavior into the behavior signature 208. Thereafter, or if the .NET supplied system subroutine call is not to be recorded, the routine 500 terminates.

With reference again to FIG. 4, after having interpreted the selected .NET instruction, at decision block 410, a determination is made as to whether there are any additional instructions in the .NET code module 202 to be evaluated. If there are additional instructions in the .NET code module 202 to be evaluated, at block 412, the next .NET instruction to be evaluated is obtained/selected, and the process 400 returns to block 408 where the selected .NET instruction is interpreted. Alternatively, if there are no additional instructions to be evaluated, at block 414, the behavior signature 208 corresponding to the .NET code module 202 is closed. At block 416, the behavior signature 208 corresponding to the evaluated .NET code module 202 is returned, and the routine 400 terminates.

Figure 6:
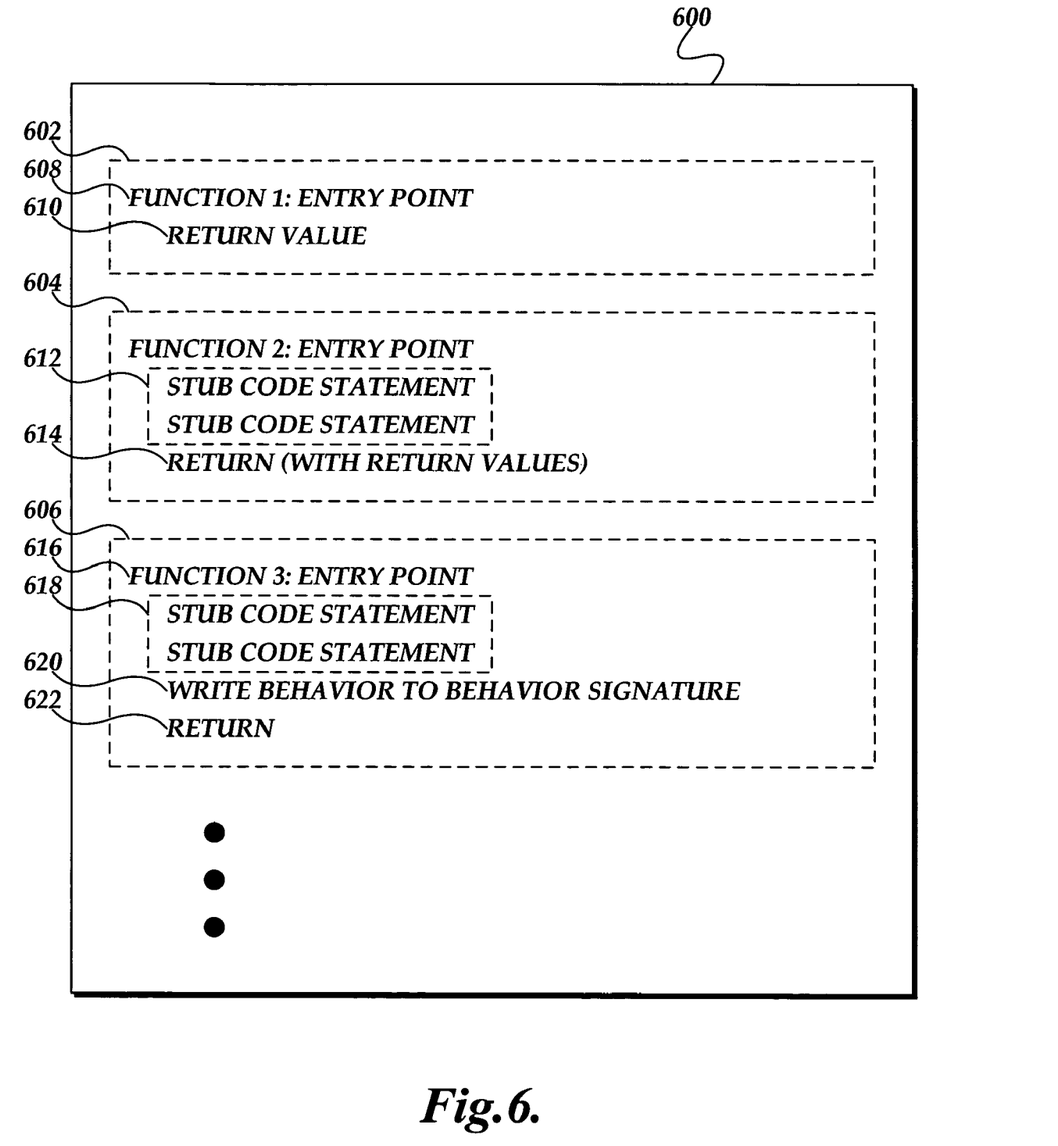
FIG. 6 is a block diagram illustrating exemplary pseudo-code routines in a stub library suitable for use in the present invention.

FIG. 6 is a block diagram illustrating exemplary pseudo-code stub routines 600 suitable for use in the present invention. As previously discussed, some .NET system supplied subroutines must be implemented because they return values which will be subsequently used by the .NET code module 202 in execution. For example, exemplary pseudo-code subroutine 602 includes simply an entry point 608 and a return instruction 610 having a return value.

As mentioned above, the functionality of some .NET supplied system subroutines must be implemented continued execution of the .NET code module 202. In these cases, as illustrated in the exemplary pseudo-code subroutine 604, those code statements 612 necessary to implement the functionality of a called, .NET supplied system subroutine are included in subroutine's implementation. Frequently, these subroutine that require some functionality to be implemented will also usually require a return value, as indicated by the return instruction 614 having a return value.

Exemplary pseudo-code subroutine 606 illustrates an exemplary "interesting" subroutine, that is to be written to the behavior signature 208. The pseudo-code subroutine includes an entry point 616, optional stub code statements 618, and a call 620 to the behavior recorder module 314 to write "interesting" subroutine call to the behavior signature 208. This exemplary pseudo-code subroutine 606 does not include a return value with its return instruction 622, but this is only illustrative, and should not be construed as limiting upon the present invention. In an actual embodiment, the return instruction 622 may or may not include a return value.

Figure 7A:
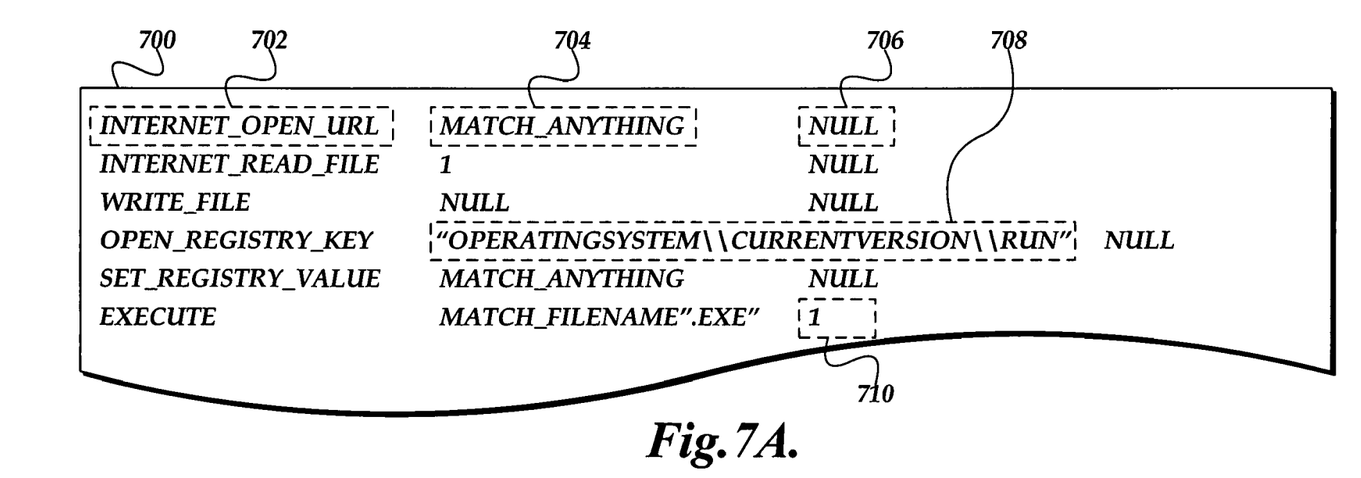
FIGS. 7A and 7B are block diagrams illustrating exemplary behavior signatures as recorded by the .NET behavior evaluation module described above in regard to FIG. 3.
Figure 7B:
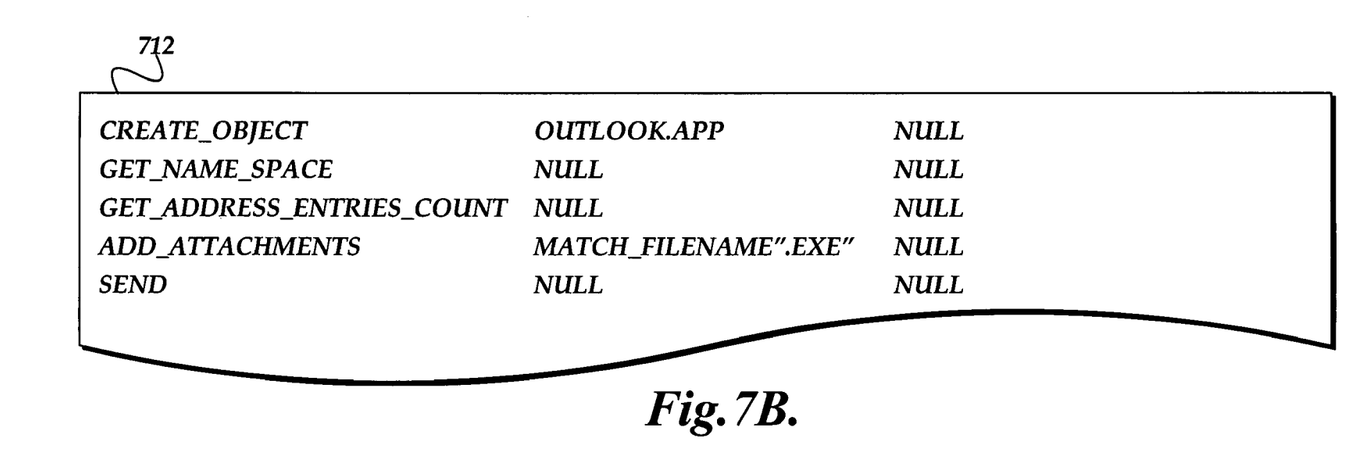

FIGS. 7A and 7B are block diagrams illustrating exemplary behavior signatures, behavior signatures 700 and 712, corresponding to hypothetical .NET code modules, such as the .NET code module 202. Each row of items in the exemplary behavior signatures, including behavior signature 700 and behavior signature 712, represents a behavior that was exhibited by a .NET code module as it was executed and recorded by the .NET behavior evaluation module 204.

As illustrated in behavior signature 700 and behavior signature 712, each behavior includes three elements: a behavior token, such as behavior token 702; a first parameter value, such as parameter value 704; and a second parameter value, such as parameter value 706. It should be understood that the described embodiment of behavior signatures is for illustration purposes only, and should not be construed as limiting upon the present invention. The actual organization of a behavior signature may vary substantially according to implementation details.

A behavior token, such as behavior token 702, is used to identify the particular "interesting" behavior recorded by the .NET behavior evaluation module 204. According to aspects of the present invention, each interesting behavior recorded by the .NET behavior evaluation module 204 is associated with a unique behavior token, such as behavior token 702. In contrast, parameter values recording with an exhibited behavior may include almost any type of value or value token. For example, parameter value 704 illustrates a value token to representing a "match anything" value. Alternatively, a parameter value may not be necessary to record or even desirable. In such cases, a parameter value of "null," such as parameter value 706, may be added to indicate that there is no parameter present. Further, a parameter value, such as parameter value 710, may be a numeric value, or, as in the case of parameter value 708, may be a character string passed to the interesting, recorded .NET system supplied subroutine.

In regard to FIGS. 7A and 7B, behavior signature 700 (FIG. 7A) illustrates exemplary recorded behaviors corresponding to a so-called "Trojan horse" .NET code module, while behavior signature 712 (FIG. 7B) illustrates exemplary recorded behaviors associated with a .NET mass mailing worm.

While the preferred embodiment of the invention has been illustrated and described, it will be appreciated that various changes can be made therein without departing from the spirit and scope of the invention.

The invention claimed is:

1. A computer system for securely gathering exhibited behaviors of a code module that is to be executed in an environment, the computer system comprising:

a memory;

an interpreter module that provides a secure virtual environment for executing selected instructions in the code module, the secure virtual environment implementing the functionality of the environment to the extent that a sufficiently realistic virtual environment is created for the code module based on the selected instructions;

a behavior recorder module that records calls from the code module to subroutines in the secure virtual environment and records parameter values passed from code module to called subroutines in the secure virtual environment, the recorded calls and recorded parameter values recorded into a behavior signature for the code module, the behavior signature including items representing a behavior that was exhibited by the code module as the behavior was executed and recorded, and at least a unique behavior token and one or more recorded parameter values, the unique behavior token representing an interesting behavior that was recorded; and a stub library module comprising virtual subroutines that simulate corresponding system-supplied subroutines of the environment, at least some virtual subroutines being fully implemented, at least some virtual subroutines not being implemented and, when handled, being ignored, and at least some virtual subroutines, when handled, returning a default return value, the stub library module comprising a plurality of stub libraries comprising at least a memory manager stub library and a file system stub library, wherein when the stub library module receives a subroutine call, the stub library module determines which stub library contains the subroutine, determines whether the stub library containing the subroutine is loaded, and when the stub library containing the subroutine is not loaded, loads the stub library containing the subroutine, at least a subset of the virtual subroutines including a call to the behavior recorder module, wherein for any virtual subroutine that includes the call to the behavior recorder module, the express-call to the behavior recorder module indicating that the behavior recorder module is to record the called virtual subroutine and parameter values passed to the called virtual subroutine into the behavior signature for the code module.

2. The computer system of claim 1, wherein the code module is a platform independent interpreted code module comprising interpretable tokens suitable for execution in an interpretive environment.

3. A computer-readable medium bearing computer-executable components which, when executed on a computing device, carry out a method for evaluating whether a code module, that is to be executed in a environment, corresponds to known malware, the method comprising:

providing a virtual environment suitable for evaluating instructions in the code module, the virtual environment including:

an interpreter module that provides a secure virtual environment for executing at least some of the instructions in the code module, the virtual environment implementing the functionality of the environment to the extent that a sufficiently realistic virtual environment is created for the code module based on the at least some instructions;

a behavior recorder module that records calls from the code module to subroutines in the secure virtual environment and records parameter values passed from the code module to called virtual subroutines in the secure virtual environment, the recorded calls and recorded parameter values recorded into a behavior signature for the code module; and a stub library module comprising virtual subroutines that simulate corresponding system-supplied subroutines of the environment, at least some virtual subroutines being fully implemented, at least some virtual subroutines not being implemented and, when handled, being ignored, and at least some virtual subroutines, when handled, returning a default return value, the stub library module comprising a plurality of stub libraries comprising at least a memory manager stub library and a file system stub library, wherein when the stub library module receives a subroutine call, the stub library module determines which stub library contains the subroutine, determines whether the stub library containing the subroutine is loaded, and when the stub library containing the subroutine is not loaded, loads the stub library containing the subroutine at least some of the virtual subroutines including an call to the behavior recorder module, wherein for any virtual subroutine that includes the call to the behavior recorder module, the call to the behavior recorder module indicating that the behavior recorder module is to record the called virtual subroutine and parameter values passed to the called virtual subroutine into the behavior signature for the code module, use of the express call to the behavior recorder module facilitating selective activation of behavior recording for interesting subroutine calls;

executing the code module in a selected order in the virtual environment and obtaining a behavior signature corresponding to the code module as a result of executing the code module in the virtual environment;

evaluating the behavior signature corresponding to the code module to determine whether the code module exhibits behaviors corresponding to malware; and providing an indication as to whether the code module exhibits behaviors corresponding to malware.

4. The computer-readable medium as recited in claim 3, wherein providing a virtual environment suitable for evaluating instructions in the code module the virtual environment comprises providing a sandbox for evaluating instructions in The code module.

5. The computer-readable medium as recited in claim 3, wherein executing the code module in a selected order in the virtual environment and obtaining a behavior signature corresponding to the code module comprises executing at least one virtual subroutine that includes the call to the behavior recorder module and, in response to the express call, recording the call to the virtual subroutine and the parameters passed to the virtual subroutine into the behavior signature for the code module.

* * * * *

UNITED STATES PATENT AND TRADEMARK OFFICE
CERTIFICATE OF CORRECTION

| | | |
|---|---|---|
| PATENT NO. | : 7,730,530 B2 | Page 1 of 1 |
| APPLICATION NO. | : 10/769097 | |
| DATED | : June 1, 2010 | |
| INVENTOR(S) | : Daniel M. Bodorin et al. | |

It is certified that error appears in the above-identified patent and that said Letters Patent is hereby corrected as shown below:

Title page, item (54), under "Title" column 1, line 2, delete "ON" and insert -- OF --, therefor.

In column 1, line 2, delete "ON" and insert -- OF --, therefor.

In column 5, line 36, delete "mal are" and insert -- malware --, therefor.

In column 10, line 48, in Claim 1, delete "express-call" and insert -- call --, therefor.

In column 12, line 5, in Claim 3, before "call" delete "express".

In column 12, line 22, in Claim 4, delete "The" and insert -- .NET --, therefor.

Signed and Sealed this
Eighth Day of March, 2011

David J. Kappos
*Director of the United States Patent and Trademark Office*